United States Patent
Kuroda et al.

(10) Patent No.: US 9,724,892 B2
(45) Date of Patent: Aug. 8, 2017

(54) WATER REPELLENT FILM AND COMPONENT FOR VEHICLE INCLUDING THE FILM

(75) Inventors: Motohiko Kuroda, Machida (JP); Yuji Noguchi, Sagamihara (JP); Isao Yamamoto, Yokohama (JP); Takayuki Fukui, Yokohama (JP)

(73) Assignee: NISSAN MOTOR CO., LTD., Yokohama-shi (JP)

(*) Notice: Subject to any disclaimer, the term of this patent is extended or adjusted under 35 U.S.C. 154(b) by 0 days.

(21) Appl. No.: 13/202,853

(22) PCT Filed: May 31, 2010

(86) PCT No.: PCT/JP2010/059222
§ 371 (c)(1),
(2), (4) Date: Aug. 23, 2011

(87) PCT Pub. No.: WO2011/151885
PCT Pub. Date: Dec. 8, 2011

(65) Prior Publication Data
US 2012/0003427 A1 Jan. 5, 2012

(51) Int. Cl.
*B32B 3/00* (2006.01)
*B32B 3/30* (2006.01)
(Continued)

(52) U.S. Cl.
CPC .............. *B32B 3/30* (2013.01); *B32B 7/02* (2013.01); *B32B 25/08* (2013.01); *B32B 27/08* (2013.01);
(Continued)

(58) Field of Classification Search
CPC .. B32B 7/02; B32B 3/30; B32B 25/08; B32B 27/08; B32B 27/308; B32B 27/36;
(Continued)

(56) References Cited

U.S. PATENT DOCUMENTS 5,554,683 A * 9/1996 Oshima ......................... 524/569
5,622,580 A * 4/1997 Mannheim ........ B32B 17/10018
100/295
(Continued)

FOREIGN PATENT DOCUMENTS

EP 0 658 525 A2 6/1995
EP 1 921 470 A2 5/2008
(Continued)

OTHER PUBLICATIONS

Dub, S.N. and V.V. Starikov. "Elasticity module and hardness of niobium and tantalum anode oxide films." Functional Materials 14, No. 3 (2007). Accessed Jun. 24, 2012.*
(Continued)

*Primary Examiner* — Nancy Johnson
(74) *Attorney, Agent, or Firm* — Foley & Lardner LLP

(57) ABSTRACT

A water repellent film (200) according to the present invention includes a first layer (10) having a plurality of fine protrusions (100) on the surface thereof, a second layer (20) covering the fine protrusions (100) and having a water repellent property, and a third layer (30) provided on the surface of the first layer (10) on the opposite side of the fine protrusions (100). When a modulus of elasticity of the first layer (10) is defined as E1, a modulus of elasticity of the second layer (20) is defined as E2, and a modulus of elasticity of the third layer (30) is defined as E3, a definition of E2>E1>E3 is fulfilled. Accordingly, the water repellent film having excellent resistance to abrasion in which a fine structure is not easily abraded and damaged by an external friction force or the like can be obtained.

15 Claims, 5 Drawing Sheets

(51) Int. Cl.
*B32B 7/02* (2006.01)
*B32B 25/08* (2006.01)
*B32B 27/08* (2006.01)
*B32B 27/30* (2006.01)
*B32B 27/36* (2006.01)

(52) U.S. Cl.
CPC ............ *B32B 27/308* (2013.01); *B32B 27/36* (2013.01); *B32B 2255/10* (2013.01); *B32B 2255/20* (2013.01); *B32B 2255/205* (2013.01); *B32B 2255/26* (2013.01); *B32B 2307/40* (2013.01); *B32B 2307/54* (2013.01); *B32B 2307/554* (2013.01); *B32B 2307/73* (2013.01); *B32B 2457/20* (2013.01); *B32B 2590/00* (2013.01); *B32B 2605/00* (2013.01); *B32B 2605/006* (2013.01); *Y10T 428/24355* (2015.01)

(58) Field of Classification Search
CPC .......... B32B 2605/006; B32B 2255/10; B32B 2255/20; B32B 2255/205; B32B 2255/26; B32B 2307/40; B32B 2307/54; B32B 2307/554; B32B 2307/56; B32B 2307/73; B32B 2457/20; B32B 2590/00; B32B 2605/00; Y10T 428/24355
USPC ...... 428/141, 212–217, 220, 142; 296/190.1, 296/48.1, 146.15
See application file for complete search history.

(56) References Cited

U.S. PATENT DOCUMENTS

| | | | |
|---|---|---|---|
| 6,444,311 B1* | 9/2002 | Friedman et al. | 428/354 |
| 6,764,745 B1 | 7/2004 | Karasawa et al. | |
| 2003/0124360 A1 | 7/2003 | Reihs et al. | |
| 2003/0211333 A1* | 11/2003 | Watanabe et al. | 428/422.8 |
| 2005/0046967 A1 | 3/2005 | Kosaka et al. | |
| 2006/0159934 A1 | 7/2006 | Reihs et al. | |
| 2007/0141355 A1 | 6/2007 | Kosaka et al. | |
| 2007/0231542 A1* | 10/2007 | Deng et al. | 428/141 |
| 2008/0107868 A1* | 5/2008 | Kuroda et al. | 428/141 |
| 2008/0199659 A1* | 8/2008 | Zhao | 428/161 |
| 2010/0273944 A1* | 10/2010 | Kobayashi | B29C 47/0021 525/55 |
| 2012/0043693 A1* | 2/2012 | King | B29C 33/3857 264/219 |

FOREIGN PATENT DOCUMENTS

| | | | |
|---|---|---|---|
| JP | 6-116430 A | 4/1994 | |
| JP | 2005-31538 A | 2/2005 | |
| JP | 2006-181486 A | 7/2006 | |
| JP | WO 2007108501 A1 * | 9/2007 | ......... B29C 47/0021 |
| JP | 2008-122435 A | 5/2008 | |
| RU | 2 271 026 C1 | 2/2006 | |
| RU | 2 282 599 C2 | 8/2006 | |
| WO | WO 2010/042672 A1 | 4/2010 | |

OTHER PUBLICATIONS

"Elastic Properties and Young Modulus for some Materials." http://www.engineeringtoolbox.com/young-modulus-d_417.html. Accessed Jun. 24, 2012.*
http://www.engineeringtoolbox.com/young-modulus-d_417.html, accessed Sep. 16, 2014.*
http://www.matbase.com/material-categories/natural-and-synthetic-polymers/engineering-polymers/material-properties-of-liquid-crystal-polymer-lcp.html#properties. accessed May 14, 2015.*
http://www.azom.com/properties.aspx?ArticleID=2004. accessed Aug. 12, 2015.*
Ardel(R) Polyarylate. http://www.emcoplastics.com/materials/ardel-polyarylate/ardel/. accessed May 24, 2016.*
Japanese Industrial Standard, Testing Methods for Thermosetting Plastics, JIS K 6911, 1995, 99 pages, Japanese Standards Association.
European Office Action, May 8, 2014, 6 pages.
European Search Report, Oct. 14, 2013, 7 pages.
Christoph Jaroschek, Das Ende des Biegemoduls, Zeitschrift Kunststofftechnik, Journal of Plastics Technology, Jan. 2012, pp. 515-524, vol. 8, No. 5.
Sieghard Millow, Elastizitätsmodul, RÖMPP Online, Version 3.37, Aug. 2010, 1 page, URL:http://www.roempp.com/prod3/roempp.php.
Bodo Carlowitz, Kunststofftabellen, 3., Völlig Überarbeitete und Erweiterte Auflage, 1986, 4 pages.
European Office Action, Sep. 18, 2014, 6 pages.
Johan G. Kloosterboer, Network Formation by Chain Crosslinking Photopolymerization and its Applications in Electronics, Advances in Polymer Science, vol. 84, 1998, pp. 1, 6.
European Summons to Attend Oral Proceedings, Jan. 26, 2015, 4 pages.

* cited by examiner

WATER REPELLENT FILM AND COMPONENT FOR VEHICLE INCLUDING THE FILM

TECHNICAL FIELD

The present invention relates to a film having a water repellent function. More particularly, the present invention relates to a water repellent film capable of preventing abrasions and damages due to an external friction force caused to fine protrusions formed on the surface of the film, and relates to a component for a vehicle including the film.

BACKGROUND ART

A fine structure has fine protrusions formed on the surface thereof, and has a water repellent/hydrophilic function and an antireflection function depending on a material and a dimensional configuration of the fine structure. Therefore, surfaces of various substrates applied with such a fine structure can have an antireflection function with respect to light and a water repellent function to prevent adhesion of liquid, such as water in particular. For example, in order to provide such an antireflection function, a fine structure is favorably used for optical elements such as lenses for mechanical equipment (for example, refer to Patent Literature 1).

CITATION LIST

Patent Literature

Patent Literature Japanese Patent Unexamined Publication No. 2005-31538

SUMMARY OF INVENTION

However, in the case where the fine structure described in Patent Literature 1 is applied to a member such as a window panel of a vehicle that is subjected to various environmental conditions, when dirt adhered to the surface of the member because of rain or the like is removed with a cloth, the fine structure is easily abraded and damaged. Thus, there is a problem with a water repellent property of the fine structure that is impaired in a short period of time.

The present invention has been made in view of such a conventional problem. It is an object of the present invention to provide a water repellent film having excellent resistance to abrasion, in which a fine structure is not easily abraded and damaged by an external friction force such as a removal of dirt with a cloth on a surface thereof, and a component for a vehicle including the film.

A water repellent film according to the embodiment of the present invention includes: a first layer having a plurality of fine protrusions on a surface thereof; a second layer covering the fine protrusions and having a water repellent property; and a third layer provided on a surface of the first layer on an opposite side of the fine protrusions. When a modulus of elasticity of the first layer is defined as E1, a modulus of elasticity of the second layer is defined as E2, and a modulus of elasticity of the third layer is defined as E3, a definition of E2>E1>E3 is fulfilled.

DESCRIPTION OF EMBODIMENTS

Figure 1:
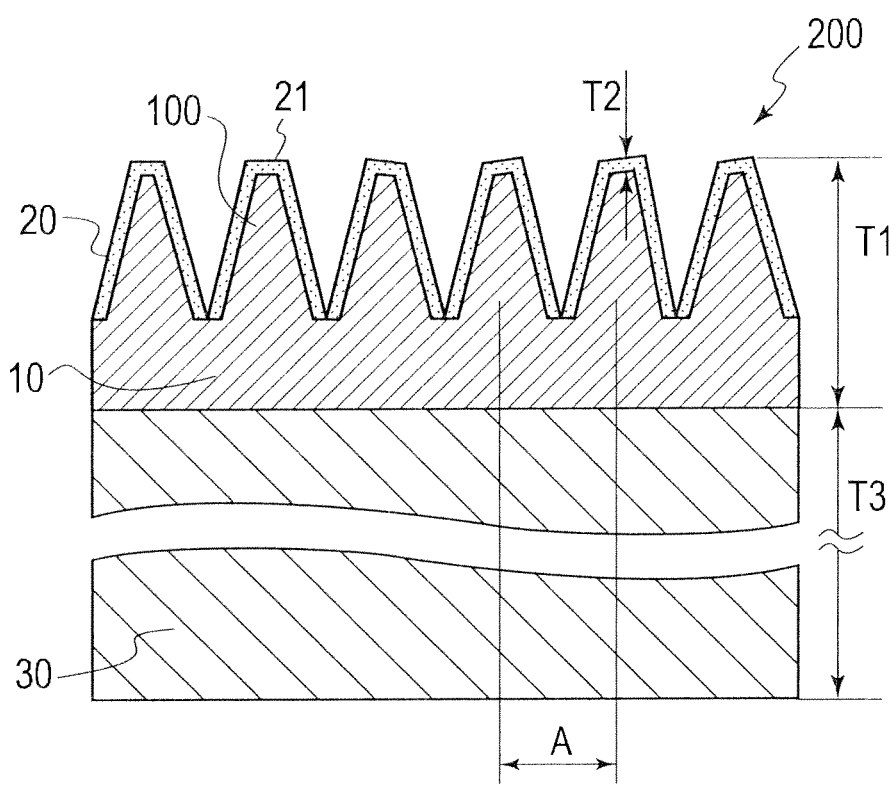
FIG. 1 is a partial cross-sectional view showing one example of a water repellent film according to the embodiment of the present invention.

A description will be made below in detail of a water repellent film and a component for a vehicle including the film according to the present invention with reference to the drawings. Note that, the dimensional ratios in the drawings are exaggerated for convenience of explanation, and may be different from the actual ratios. In the present description. "%" with regard to concentrations, contents and the like represents a mass percentage unless otherwise specified.

[Water Repellent Film]

A water repellent film 200 according to the embodiment of the present invention includes a first layer 10 having a plurality of fine protrusions 100 on the surface thereof, and a second layer 20 covering the surfaces of the fine protrusions 100 and having a water repellent property. In addition, a third layer 30 is provided on the surface of the first layer 10 on the opposite side of the surface provided with the fine protrusions 100. When a modulus of elasticity of the first layer 10 is defined as E1, a modulus of elasticity of the second layer 20 is defined as E2, and a modulus of elasticity of the third layer 30 is defined as E3, the definition of E2>E1>E3 is fulfilled.

Figure 2:
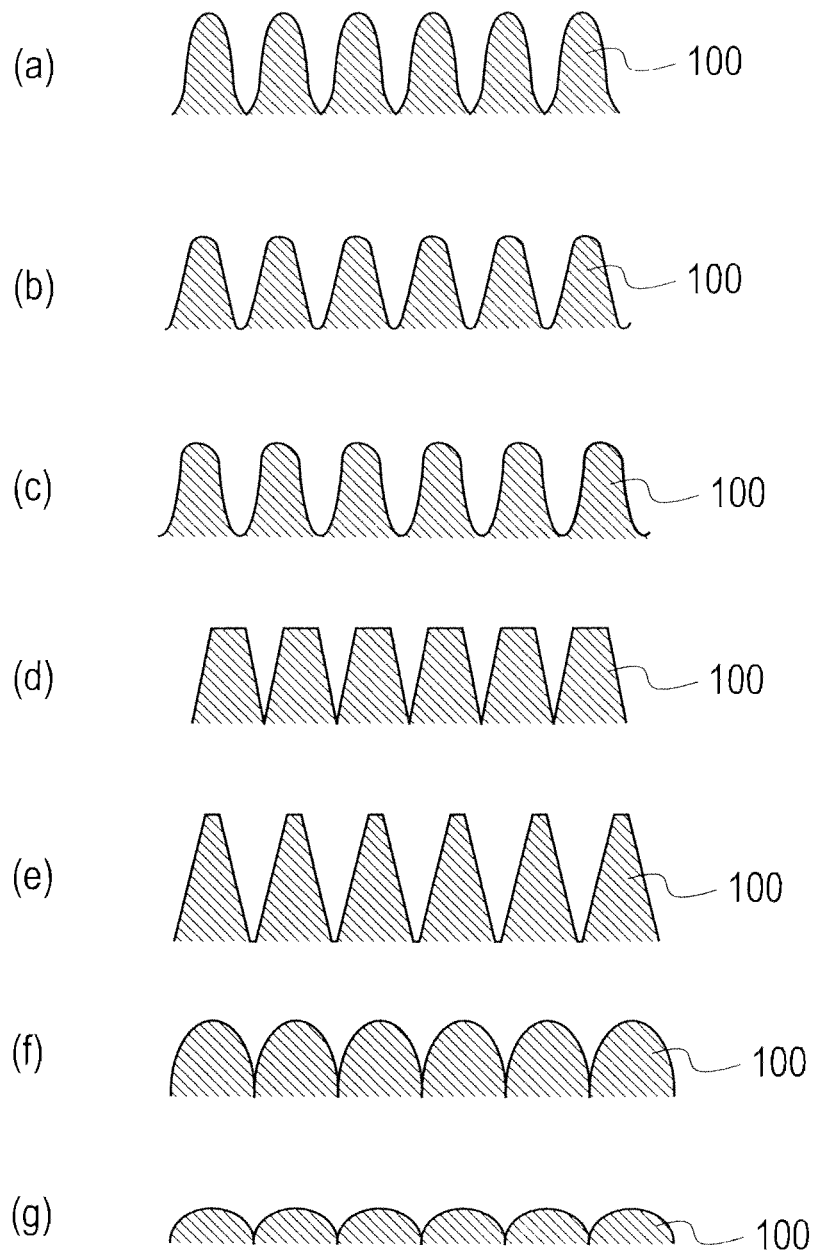
FIG. 2 is a schematic view showing a configuration example of fine protrusions in a water repellent film according to the embodiment of the present invention.

FIG. 1 shows the water repellent film 200 according to the embodiment of the present invention. The water repellent film 200 has the fine protrusions 100 formed into a frustum shape. Examples of the configuration of the fine protrusions 100 to be favorably used include a frustum shape such as a circular truncated cone and a truncated pyramid, and a cone or pyramid shape. In addition, other configurations such as a deformed cone shape such as a bell shape and an acorn shape, a deformed pyramid shape having curved side surfaces, a round-tipped shape, and a shape inclined from a center line, may be applied to the fine protrusions 100. FIG. 2 shows examples of the cross-sectional configuration that the fine protrusions 100 may employ in the water repellent film according to the embodiment of the present invention.

Figure 3:
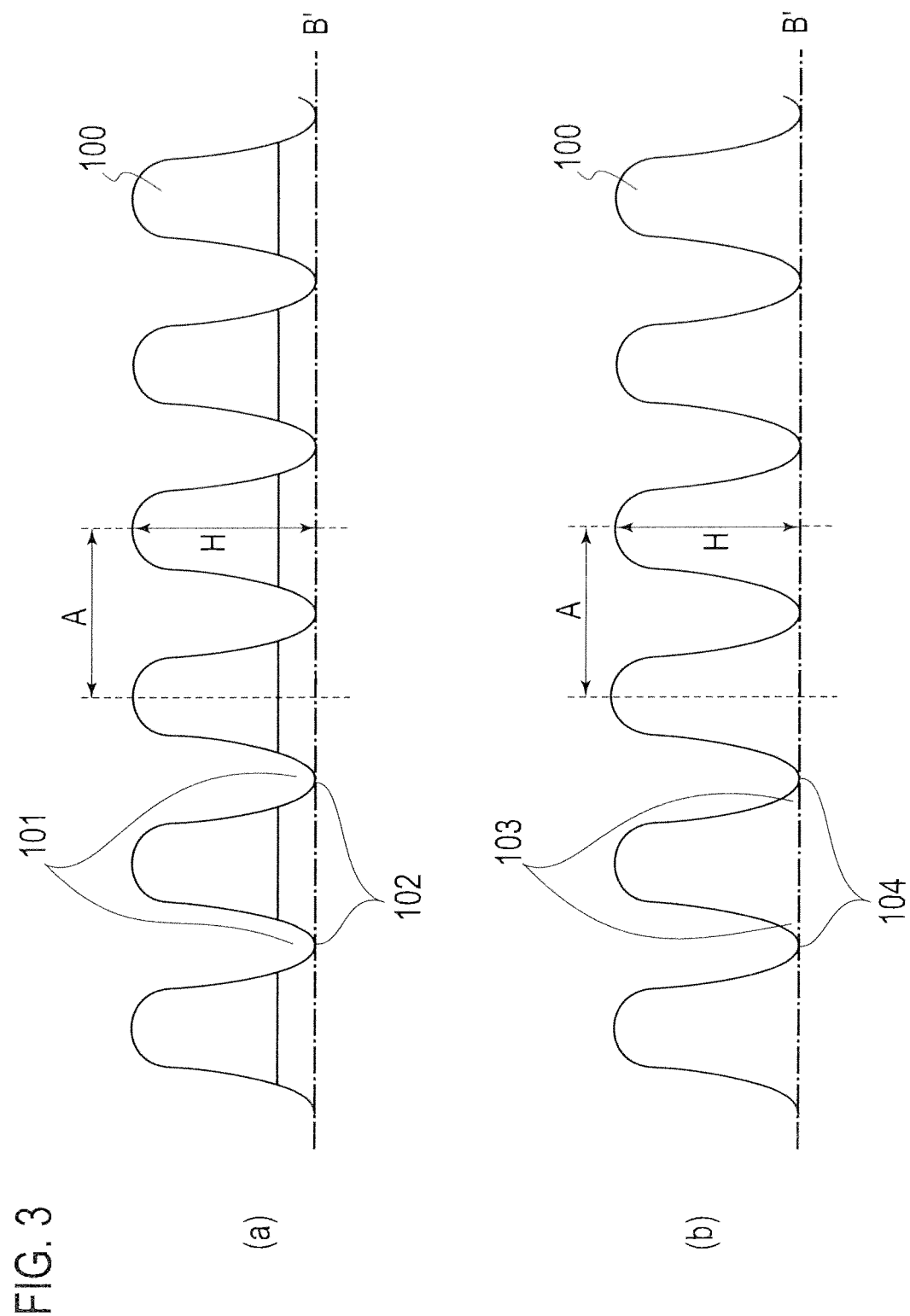
FIG. 3 is a schematic view showing a structural example of fine protrusions in a water repellent film according to the embodiment of the present invention.

Examples of a bottom surface configuration of the fine protrusions 100 to be favorably used include a polygonal shape and a substantially circular shape. In addition, other shapes such as a star shape and an oval shape may be used. The water repellent film of the present invention may include concave portions 101 between the fine protrusions 100 as long as the fine protrusions 100 are two-dimensionally aligned with a predetermined pitch, as shown in FIG. 3. In the present description, as shown in FIG. 3(a), when it is assumed that there is a surface B' passing through bottoms 102 of the respective concave portions 101, each section on the surface B' sectioned by the bottoms 102 of the concave portions 101 surrounding the fine protrusions 100 is defined as a bottom surface of the respective fine protrusions 100. Similarly, in the case where base portions 103 of the fine protrusions 100 have curved surfaces as shown in FIG. 3(*b*), when it is assumed that there is the surface B' passing through bottoms 104 between the respective base portions 103 of the fine protrusions 100, each section on the surface B' sectioned by the bottoms 104 between the base portions 103 surrounding the fine protrusions 100 is defined as a bottom surface of the respective fine protrusions 100.

A pitch A of the respective fine protrusions 100 is preferably 50 µm or less. When the pitch A between the fine protrusions 100 adjacent to each other is more than 50 µm, an effective water repellent property of various window panels using such a water repellent film is not easily exerted. Namely, since water droplets of a drizzly rain have a size of approximately 50 µm, water droplets are infiltrated in gaps between the fine protrusions, and the water droplets are not easily removed from the surface of the water repellent film. However, when the surface of the second layer 20 formed on the fine protrusions 100 is subjected to water repellent treatment using a water repellent material as described below, the water repellent film may have a high water repellent property even when the pitch A is more than 50 µm. Note that, in the present description, the pitch A of the respective fine protrusions 100 represents a distance between each barycenter in the bottom surfaces of the fine protrusions 100 adjacent to each other.

When an antireflection function is applied to the water repellent film 200, the pitch A of the respective fine protrusions 100 is preferably 380 nm or less. Namely, the pitch A of the fine protrusions 100 is preferably equal to or less than a wavelength of visible light which is not more than 380 nm to 750 nm. When the pitch A exceeds 380 nm, the visible light is partially diffused or diffracted by the fine protrusions 100, and accordingly a reflectance of the light may become large. The pitch A of the respective fine protrusions 100 is more preferably 150 nm or less. When the pitch A is 150 nm or less, the surface roughness of the water repellent film is not more than an average surface roughness of human nails. Therefore, performance of abrasion resistance to scratch of nails is effectively exerted on various window panels using the water repellent film. As described below, a high water repellent property is exerted on the water repellent film when the fine protrusions 100 are formed on the surface of the water repellent film so as to increase a surface area, and when gaps for trapping air are formed between the fine protrusions 100 adjacent to each other. Consequently, the pitch A of the fine protrusions 100 is preferably 50 nm more.

In the first layer 10, a height H of the fine protrusions 100 is preferably 100 nm or more. When the height H of the fine protrusions 100 is less than 100 nm, an antireflection effect may be decreased. In addition, when the height H of the fine protrusion 100 is too low, it is hard to trap air between the fine protrusions 100, which may cause a decrease of a water repellent property. On the other hand, when the height H of the fine protrusions 100 is too high, the fine protrusions 100 are easily fractured and at the same time moldability may be decreased. Thus, the height of the fine protrusions 100 is preferably 600 nm or less. It is to be noted that, when the surface of the second layer 20 is subjected to water repellent treatment as described above, a high water repellent property may be exerted even when the height H is less than 100 nm. The height of the fine protrusions 100 is a distance between each bottom 104 of the fine protrusions 100 and each tip of the fine protrusions 100 in the perpendicular direction to the bottom surface B'. When the concave portions 101 are provided between the respective fine protrusions 100, the height as indicated by the reference symbol H in FIG. 3 is a distance each bottom (the deepest part) 102 of the concave portions 101 and each tip of the fine protrusions 100 in the perpendicular direction to the bottom surface B'.

In the water repellent film 200, when the fine protrusions 100 are formed into a cone or pyramid shape, or a truncated cone or truncated pyramid shape (tapered shape), and two-dimensionally aligned with the pitch A of 380 nm or less, a dimension of the fine asperity on the surface cannot be recognized by visible light. As a result, coloration due to interference of light disappears, and therefore, the water repellent film can be used as a transparent material. Moreover, since reflection of surrounding scenery on the film can be decreased due to an antireflection effect, the water repellent film can be favorably used for window panels for vehicles, ships and vessels, and aircraft. Further, since the gaps between the fine protrusions 100 are elongated, and water infiltration because of impact of water droplets is prevented, the water repellent film exerts a superhydrophohic property with no adhesion of water droplets such as rain, depending on the materials to be selected.

The dimension of the fine protrusions 100 in the water repellent film of the present invention is a nanometer order as described above. Thus, the configuration and pitch of the fine protrusions 100 do not have a complete geometric configuration, but vary to some extent because of a manufacturing restriction. However, the there is no limitation in scope of the present invention even if variations of the configuration and pitch of the fine protrusions are caused.

As described above, the water repellent film 200 according to the present embodiment includes the first layer 10 having a plurality of the fine protrusions 100, the second layer 20 covering the entire surface of the fine protrusions 100 and having a water repellent property, and the third layer 30 provided on the surface of the first layer 10 on the opposite side of the fine protrusions 100. In addition, when the modulus of elasticity of the first layer 10 is defined as E1, the modulus of elasticity of the second layer 20 is defined as E2, and the modulus of elasticity of the third layer 30 is defined as E3, the definition of E2>E1>E3 is fulfilled. Due to such a configuration, destruction of the fine protrusions 100, that is, abrasions and damages can be prevented.

The external input such as a removal of dirt with a cloth may be broadly divided into an input in a shear direction substantially along the surface of the first layer 10, and an input in a compressive direction substantially perpendicular to the surface of the first layer. With regard to the input in the shear direction, the second layer 20 has the modulus of elasticity E2 higher than that of the first layer 10 so as not to be easily abraded. Further, the input of shear force transmitted to the first layer 10 is absorbed and dispersed. In addition, since the first layer 10 has the modulus of elasticity E1 lower than that of the second layer 20, the input of shear force to the fine protrusions 100 is flexibly absorbed.

With regard to the input in the compressive direction, the third layer 30 having the modulus of elasticity E3 lower than that of the first layer 10 mainly receives the input so as to be deformed elastically, thereby preventing destruction of the fine protrusions 100. The first layer 10 is required to have a predetermined level of the modulus of elasticity E1 in view of enhancing a dimensional accuracy at the time of the formation of the fine protrusions 100 and preventing the fine protrusions 100 from scratches of nails. However, when the first layer 10 is only provided with the second layer 20 covering the first layer and having the higher modulus of elasticity E2, the first layer 10 is mainly subjected to elastic deformation due to the input in the compressive direction; on the other hand, the second layer 20 is not elastically deformed very much. In such a case, since the amount of elastic deformation of the first layer 10 relatively becomes large, it is hard to ensure resistance to abrasion. However, when the third layer 30 having the modulus of elasticity E3 lower than that of the first layer 10 is provided on the surface of the first layer 10 on the opposite side of the fine protrusions 100, the third layer 30 is subjected to elastic deformation. Accordingly, the amount of elastic deformation of the first layer 10 or the second layer 20 can be decreased.

Figure 4:
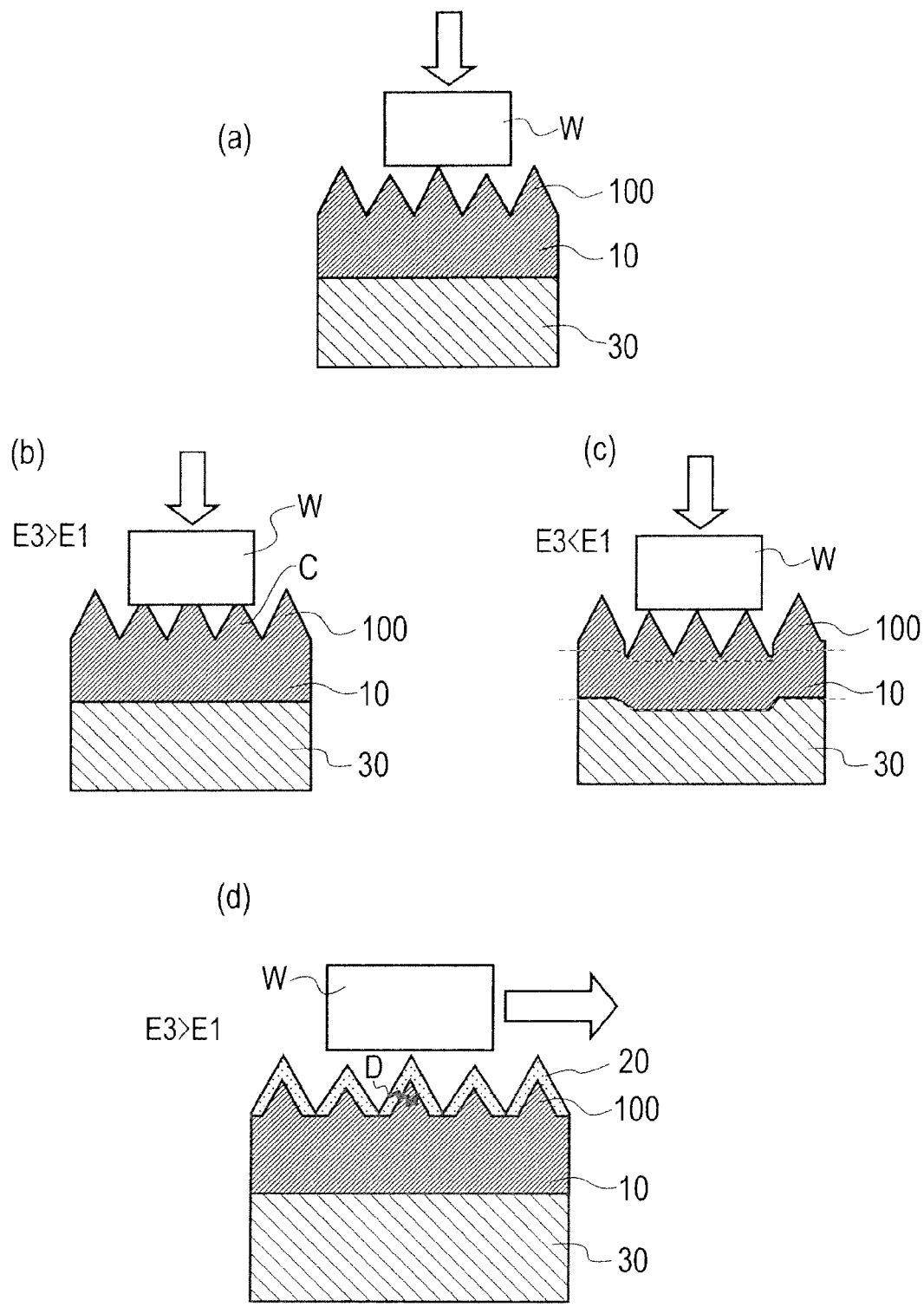
FIG. 4 is a schematic view explaining input conditions in a compressive direction and in a shear direction with respect to fine protrusions in a water repellent film according to the embodiment of the present invention.

The influence of the inputs in the compressive direction and the shear direction with respect to the fine protrusions will be further explained. FIGS. 4(*a*) to 4(*c*) show water repellent films not provided with the second layer. In particular, in FIG. 4(*b*), the modulus of elasticity E3 of the third layer 30 and the modulus of elasticity E1 of the first layer 10 have a relationship of E3>E1. In FIG. 4(*c*), the modulus of elasticity E3 of the third layer 30 and the modulus of elasticity E1 of the first layer 10 have a relationship of E1>E3. As shown in FIG. 4(*b*), when a load W is applied in the compressive direction, the first layer 10 is mainly deformed and the third layer 30 is not easily deformed since the modulus of elasticity E3 of the third layer 30 is higher than the modulus of elasticity E1 of the first layer 10. As a result, the load W is concentrated on the fine protrusions 100, so that the fine protrusions 100 are crushed by the load W (refer to the reference symbol C). On the other hand, as shown in FIG. 4(*c*), when the modulus of elasticity E3 of the third layer 30 is lower than the modulus of elasticity E1 of the first layer 10, not only the first layer 10 but also the third layer 30 are deformed, and the load W applied to the fine protrusions 100 is dispersed. Accordingly, the crush of the fine protrusions 100 can be prevented.

It is to be noted that, when the second layer is not formed in the water repellent film, and particularly when the first layer 10 is made of a material such as a resin material as described later having the modulus of elasticity E1, the fine protrusions are easily subjected to abrasion from the tips thereof due to continuous inputs in the shear direction. In view of this, the water repellent film according to the present invention is provided with the second layer having a high modulus of elasticity and rigidity in order to improve resistance to abrasion. However, even if the second layer 20 is formed in the film, the fine protrusions 100 are easily fractured when the modulus of elasticity E3 of the third layer 30 is higher than the modulus of elasticity E1 of the first layer 10, or when the third layer is not provided, as shown in FIG. 4(*d*). In other words, since the surface of the second layer is rigid, moment is concentrated on a portion D of a ridge line of the fine protrusions 100 due to the input in the shear direction (horizontal direction), and therefore, the fine protrusions 100 are easily fractured. When the load W is applied in a sliding direction while evenly coming in contact with the surface of the second layer, the second layer is not easily fractured since the surface thereof is rigid. On the other hand, when the load W is applied in a sliding direction not evenly coming in contact with the surface of the second layer, the input locally becomes large, and as a result, the fine protrusions 100 are fractured because of brittleness of the second layer 20. However, as described above, when the modulus of elasticity E3 of the third layer 30 is lower than the modulus of elasticity E1 of the first layer 10, the third layer 30 is deformed, so that the load W applied to the fine protrusions 100 is dispersed. Accordingly, moment concentrated on the fine protrusions 100 can be prevented, and therefore, the fine protrusions 100 are not easily fractured.

As described above, since the first layer 10, the second layer 20 and the third layer 30 share the function with respect to an external input such as a removal of dirt with a cloth, the fracture of the fine protrusions 100 can be suppressed.

The modulus of elasticity E1 of the first layer 10 is particularly preferably between 0.1 GPa and 5 GPa, and the modulus of elasticity E2 of the second layer 20 is preferably between 50 GPa and 210 GPa. When the modulus of elasticity E1 of the first layer 10 is within the above-mentioned range, the second layer 20 can sufficiently exert the effect of dispersing an external input in a shear direction without being inhibited by the first layer. In addition, when the modulus of elasticity of the second layer 20 is 50 GPa or more, abrasions of the second layer 20 and plastic deformation or fracture of the first layer 10 can be surely suppressed. Moreover, when the modulus of elasticity of the second layer 20 is 210 GPa or less, brittle damages of the second layer 20 due to an external input in a shear direction can be more surely suppressed.

A thickness T1 of the first layer 10 is preferably between 1 μm and 30 μm. When the thickness of the first layer 10 is 1 μm or more, an occurrence of brittle damages (cracks) of the first layer 10 can be prevented even when the third layer 30 is deformed due to an input in a compressive direction. In addition, when the thickness of the first layer 10 is 30 μm or less, a curved surface compliance property can be easily ensured when the water repellent film 200 is applied to a molded product having a three-dimensional curved surface. Further, moldability can be easily ensured when an active energy beam curable resin is used as a material of the first layer 10.

A film thickness T2 of the second layer 20 is preferably between 1 nm and 30 nm, more preferably between 3 nm and 20 nm. With regard to the structure the fine protrusions 100 having the pitch A of 380 nm or less, the film thickness T2 of the second layer 20 is preferably between 3 nm and 10 nm. When the film thickness of the second layer 20 is within 30 nm, brittle damages of the second layer 20 can be prevented. In addition, when the film thickness is 1 nm or more, the entire fine protrusions 100 can be evenly covered with the second layer 20.

Examples of the material of the first layer 10 include: thermoplastic resins such as a non-cross-linked acrylic resin, a cross-linked acrylic resin, a cross-linked acrylic-urethane copolymer, a cross-linked acrylic-elastomer copolymer, a silicone elastomer, polyethylene, polypropylene, cross-linked polyvinyl alcohol, polyvinylidene chloride, polyethylene terephthalate, polyvinyl chloride, polycarbonate, modified polyphenylene ether, polyphenylene sulfide, polyether ether ketone, a liquid crystal polymer, fluororesin, polyarylate, polysulfone, polyether sulfone, polyamide imide, polyether imide, and thermoplastic polyimide; styrene elastomers such as polystyrene; urethane elastomers; silicone elastomers; and various gel materials.

Examples of the material of the second layer 20 include: transparent inorganic materials such as glass, silicon oxide, and aluminum oxide; and ceramic materials such as silicon nitride, magnesium oxide, titanium oxide, indium oxide, niobium oxide, zirconium oxide, zinc oxide, ITO (indium tin oxide), and barium titanate. In particular, hafnia (hafnium oxide, $HfO_2$) has a contact angle of 90 degrees or more. Therefore, a high water repellent property can be exerted even if the surface of the second layer is not subjected to chemical treatment in order to have a water repellent property.

Figure 5:
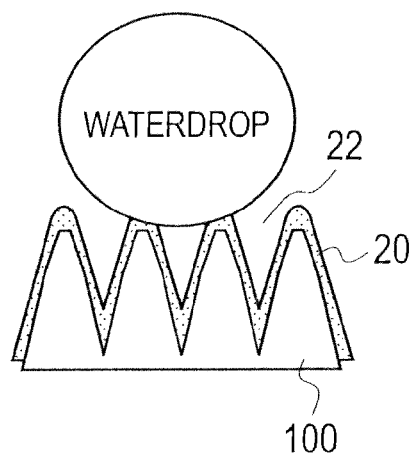
FIG. 5 is a schematic view showing a mechanism of a water repellent property in a water repellent film according to the embodiment of the present invention.

When a contact angle of the material of the second layer 20 with respect to water droplets is 90 degrees or more, a superhydrophobic state that far exceeds the contact angle of the material itself of the second layer 20 is obtained (Cassie theory) because of an increase of the surface area of the water repellent film and an effect of trapping air in gaps 22 between the fine protrusions 100 adjacent to each other, as shown in FIG. 5. In order to further effectively exert the superhydrophobic state, the contact angle of the material itself of the second layer 20 with respect to water droplets is preferably 100 degrees or more, more preferably 110 degrees or more. Especially when the material having the contact angle of 110 degrees or more is used for the second layer of the fine protrusions 100, the contact angle is amplified by the fine protrusions 100 so that the contact angle becomes 140 degrees or more, thereby improving a water repellent property to such a degree that water droplets are hardly adhered to the surface of the second layer 20.

In order to achieve such a water repellent effect, the contact angle may be controlled by selecting the material of the second layer 20 itself. As a method of controlling the contact angle more simply, a method of allowing a water repellent material having reactivity with the material of the second layer to chemically adhere to or react with a surface 21 of the second layer 20 may be used. The method of controlling the contact angle is not particularly limited as long as a plurality of the fine protrusions 100 are not blocked by the water repellent material. When the method of applying the water repellent material diluted with a solvent to the surface 21 of the second layer 20 is used, the water repellent material can be fixed to the surface 21 of the second layer 20.

Examples of the water repellent material applied to the surface 21 of the second layer 20 include silicone compounds such as $CH_3—(Si(CH_3)_2—O)_n—Si(CH_3)_2OCH_3$ (n>13; contact angle of 95 to 105 degrees), $CH_3—(Si(CH_3)_2—O)_n—SiCH_3(OCH_3)_2$ (n>13; contact angle of 95 to 105 degrees), $CH_3—(Si(CH_3)—O)_n—Si(OCH_3)_3$ (n>13; contact angle of 95 to 105 degrees), $CH_3—(Si(CH_3)_2—O)_n—Si(OC_2H_5)_3$ (n>13; contact angle of 95 to 105 degrees), $CH_3—(Si(CH_3)_2—O)_n—Si(CH_3)_2(CH_2)_3OCH_2CH(OH)CH_2NH(CH_2)_3Si(OCH_3)_3$ (n>13; contact angle of 95 to 105 degrees), $(CH_3—(Si(CH_3)_2—O)_n—Si(CH_3)_2(CH_2)_3OCH_2CH(OH)CH_2)_2N(CH_2)_3Si(OCH_3))$; (n>13; contact angle of 95 to 105 degrees). $CH_3—(Si(CH_3)_2—O)_n—Si(CH)_3$ (n>13; contact angle of 95 to 105 degrees), $CH_3—(Si(CH_3)_2—O)_n—Si(CH_3)_2Cl$ (n>13; contact angle of 95 to 105 degrees), $CH_3—(Si(CH_3)_2—O)_n—Si(CH_3)_2(CH_2)_2SiCH_3Cl_2$ (n>13; contact angle of 95 to 105 degrees), $CH_3—(Si(CH_3)_2—O)_n—SiCl_3$ (n>13; contact angle of 95 to 105 degrees), $CH_3—(Si(CH_3)_2—O)_n—Si(OCOCH_3)_3$ (n>13; contact angle of 95 to 105 degrees), $CH_3—(Si(CH_3)_2—O)_n—Si(NCO)_3$ (n>13; contact angle of 95 to 105 degrees), $CH_3—(Si(CH_3)_2—O)_n—Si(CH_3)_2(CH_2)_3O(CH_2)_3OCONHSi(NCO)_3$ (n>13; contact angle of 95 to 105 degrees), $Rf—(CH_2)_2—(Si(CH_3)_2—O)_n—Si(CH_3)_2(CH_2)_3OCH_2CH(OH)CH_2NHSi(OCH_3)_3$ (n>13; contact angle of 95 to 115 degrees), and $(Rf—(CH_2)_2—(Si(CH_3)_2—O)_n—Si(CH_3)_2(CH_2)_3OCH_2CH(OH)CH_2)_2N(CH_2)_3Si(OCH_3)_3$ (n>13; contact angle of 95 to 115 degrees) (Rf is $CF_3—(CF_3)_m—$, or $CF_3—(OCF_2)_m$; m=1 to 20). In addition, a material obtained by changing a substituent group such as Teflon (registered trademark) and the above-mentioned silane compound to isocyanate may also be used.

When the water repellent film according to the present invention is used in applications in contact with liquid other than water, such as an observation window panel of a reactor vessel or a distillation column in various types of plant equipment, and a lens surface of an endoscope, a contact angle with respect to contacting liquid is preferably set at 90 degrees or more by surface treatment or the like depending on the applications.

As shown in FIG. 1, the water repellent film 200 according to the present invention includes the third layer 30 in contact with the first layer 10 on the opposite side of the fine protrusions 100. In addition, the third layer 30 may be provided with an adhesive agent on the opposite side of the first layer 10 according to the applications of the water repellent film. When a water repellent film is used for an antireflection application, both surfaces of a transparent material are required to be provided with fine protrusions. In the present invention, both surfaces of the third layer 30 made of a transparent material are provided with the first layer 10 and the second layer 20 symmetrically, so that an antireflection effect can be obtained.

The modulus of elasticity 13 of the third layer 30 is required to be lower than the modulus of elasticity E1 of the first layer 10. Examples of the material used for the third layer 30 include general-purpose resin films and engineering plastic films. More specific examples of the material to be used include methacrylic films; polyolefin films such as polyethylene and polypropylene; polycarbonate films; polyester films such as polyethylene terephthalate (PET), polyethylene naphthalate (PEN), and fluorene derivatives; vinyl chloride films; silicone films; polyvinyl alcohol (PVA) films; ethylene vinyl acetate copolymer (EVA) films; cellulose films; and amide films. When the water repellent film is used in a portion in which further transparency is required, a transparent third layer is selected. A material of the transparent third layer is preferably methacrylic films, polycarbonate films, or PET films, more preferably methacrylic films or PET films.

When the first layer 10 has a thickness barely able to prevent brittleness, the third layer 30 functions to support rigidity and film intensity of the first layer 10. In addition, when the modulus of elasticity of the third layer is controlled to be lower than that of the first layer, the third layer is more easily deformed due to an external input in a compressive direction compared to the first layer. Therefore, an input to the fine protrusions 100 can be absorbed.

A thickness T3 of the third layer 30 is not particularly limited as long as the third layer is thick sufficient to comply with a three-dimensional curved surface or sufficient to be molded. However, the thickness T3 of the third layer 30 is preferably thicker than the thickness of the first layer 10. Due to such a thickness, the third layer 30 is more easily deformed than the first layer, and an input to the fine protrusions 100 in a compressive direction can be absorbed. When considering processability of molding and adhesion in addition to such an action, the thickness T3 of the third layer 30 is preferably approximately between 20 μm and 250 μm, more preferably between 25 μm and 200 μm, most preferably between 25 μm and 70 μm. When the thickness T3 of the third layer 30 is within the range of 20 μm to 200 μm, the deformation amount of the third layer 30 is appropriately decreased when a load in a compressed direction is input to the water repellent film 200. Accordingly, an uneven contact of friction elements at the time of friction input is not caused, a load is uniformly dispersed and therefore, the fine protrusions 100 are not easily abraded.

The modulus of elasticity E3 of the third layer 30 is at most 6 GPa when considering the type of the material described above. Therefore, with regard to deformation, a variation of the thickness of the third layer 30 is more influential than the first layer 10. In addition, in view of handling of a stacked film such as the water repellent film 200 according to the present invention, and in view of damages of the third layer at the time of compressive deformation, an elongation at break $\epsilon_{max}$ of the third layer 30 is preferably 50% or more. Note that, the upper limit of the elongation at break $\epsilon_{max}$ of the third layer 30 is not particularly limited; however, the upper limit may be 500% or less.

[Method for Manufacturing Water Repellent Film]

Hereinafter, a method for manufacturing the water repellent film according to the present invention will be explained. In the water repellent film according to the present invention, a film to be the third layer 30 is prepared first. Then, the film is provided with the fine protrusions 100 so as to form the first layer 10. A method of providing the fine protrusions 100 on the first layer 10 is not particularly limited. For example, a method of forming the fine protrusions 100 directly on the first layer is used. Further, a method of pressing a concave-convex molding die having a fine protrusion pattern to a thin film obtained by applying a material easily molded to the film prepared first so as to transfer the fine protrusion pattern to the thin film is used. As a result, the fine protrusions 100 are formed.

More specifically, a film composed of materials of the first layer and the third layer produced by a known method is prepared. Then, a molding die to form numerous fine protrusions is prepared, and the molding die and the film composed of materials of the first layer and the third layer are pressed relatively while heating one of or both of the molding die and the film. Therefore, the fine protrusions 100 can be formed on the surface of the first layer.

In addition, an active energy beam curable resin is applied on the film to be the third layer. Then, a portion between the molding die and the film to be the third layer is irradiated with an active energy beam while interposing the active energy beam curable resin, so that the resin is cured. An example of the active energy beam curable resin may be an ultraviolet beam curable resin.

After the first layer having the fine protrusions 100 is formed by the above-described methods, the second layer 20 is formed by a conventionally known method. Examples of the method of producing the second layer 20 include a Langmuir-Blodgett method (LB method), a physical vapor deposition method (PVD method), a chemical vapor deposition method (CVD method), a self-organization method, a sputtering method, a vapor polymerization method, and an evaporation method.

Further, as described above, when a water repellent material is fixed to the second layer, the water repellent material that is diluted with a solvent is applied on the second layer and then dried. In order to promote the reaction of the second layer with the water repellent material after the application of the water repellent material, heat treatment may be carried out as necessary.

[Molded Product Including Water Repellent Film]

A molded product (component) including the water repellent film according to the present invention may be preferably used for a display device that is required to have an antireflection function on the front surface thereof and is subjected to water such as rain and greasy dirt. Examples of the molded product include meter panels and window panels for vehicles and motor cycles, mobile devices such as a mobile phone and an electronic organizer, signs, and watches. A type of the display device is not particularly limited, and a system in which a mechanical display and lighting are combined such as an analog meter may be included. Moreover, a system, such as a digital meter and a monitor, using a back light and a light-emitting surface such as a liquid crystal, light-emitting diode (LED) and electroluminescence (EL), and a system using a reflective liquid crystal such as a mobile device may also be included.

Such a molded product is mainly used in places to be subjected to light. Therefore, an ultraviolet absorbing agent, an antioxidant, a radical scavenger, and the like may be added to the first layer and the third layer in order to prevent deterioration by light. In addition, a blueing agent and a fluorescent pigment for offsetting yellowing caused by resin deterioration may also be used.

A method for manufacturing the molded product including the water repellent film is not particularly limited as long as the film can be attached to the surface of the molded product. A method of attaching the film by hands while applying heat on a curved surface may be used. In addition, a laminator and the like may be used when the molded product does not have a curved surface. Further, the water repellent film according to the present invention may be attached to the molded product by use of an adhesive agent as necessary.

When the water repellent film according to the present invention is incorporated in a display device, the provision of the film on the front surface of the display device is most effective. In addition, a conventional antireflection means may be applied to the surface of the third layer on the opposite side of the first layer in the water repellent film according to the present invention. Examples of the conventional antireflection means include a means of applying an antireflection structure only provided with fine protrusions with a pitch not more than a wavelength of light, and a means of allowing reflected light from the surface of the thin film in which the thickness of the antireflection layer is controlled and reflected light from the attachment surface of the third layer to interfere with each other, so as to decrease reflection.

Figure 6:
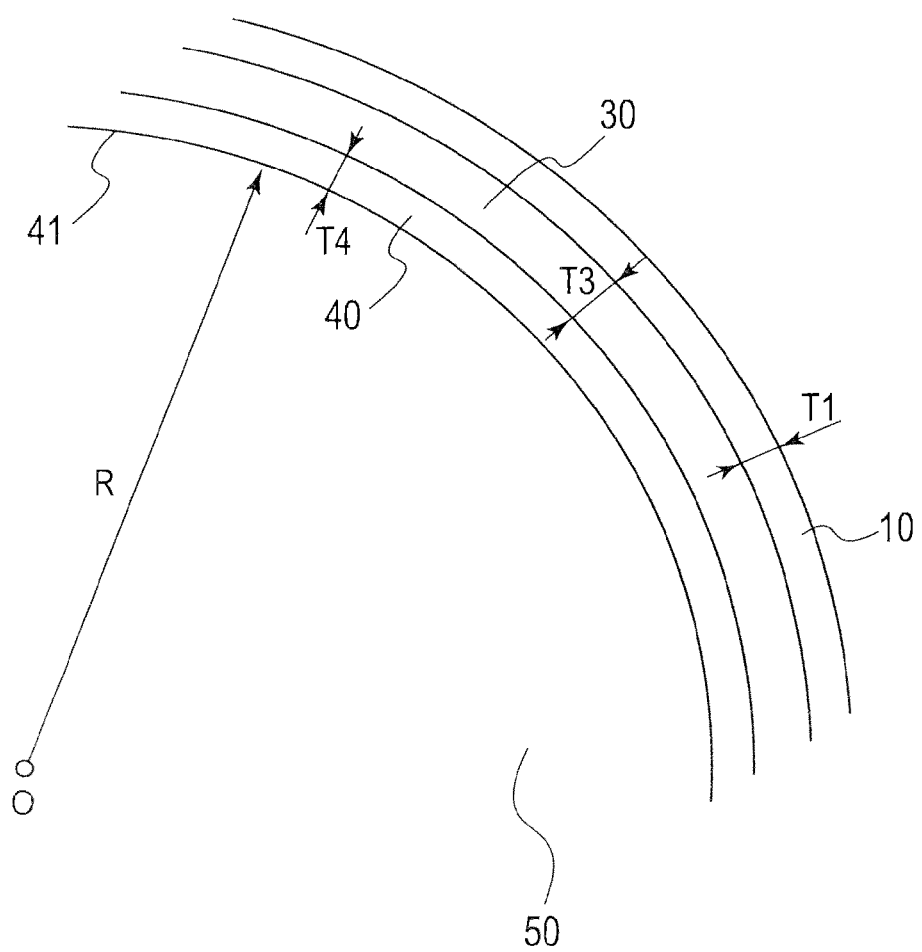
FIG. 6 is a schematic view showing elongation behavior of each layer in a case in which a water repellent film according to the embodiment of the present invention is attached to a three-dimensional curved surface.

When it is assumed that the water repellent film according to the present invention is attached to a three-dimensional curved surface, the properties required for the third layer and the first layer are determined according to a radius of curvature of the three-dimensional curved surface. In particular, the important property in molding and processing of the film for the three-dimensional curved surface is a maximum value of elongation at break B. That is, as shown in FIG. 6, it is assumed that the thickness of the first layer 10 is T1, the thickness of the third layer 30 is T3, and the thickness of an adhesion layer 40 applied on the surface of the third layer 30 on the opposite side of the first layer 10 is T4. When the water repellent film 200 is attached to a convex surface of a radius of curvature R of a component 50, the water repellent film 200 is curved on the basis of an adhesion surface 41 of the adhesion layer 40. Then, one-dimensional elongation of the uppermost surface of the first layer 10 that is the most elongated layer with respect to a distance R (radius of curvature) from the center O of curvature to the adhesion surface 41 is calculated. Thus, the maximum value of elongation at break B can be calculated according to the formula 1. Therefore, at least the material of the first layer 10 is required to have an elongation at break higher than the maximum value of elongation at break B.

$$B = \sqrt{\frac{(R+T1+T3+T4)^2}{R^2}} = \frac{R+T1+T3+T4}{R} \qquad \text{[Math 1]}$$

On the other hand, when the water repellent film 200 is attached to a concave surface of the component 50, the adhesion layer 40 is to be elongated on the basis of the uppermost surface of the first layer 10 since the first layer 10 has the higher modulus of elasticity than the third layer 30 or the adhesion layer 40. However, the adhesion layer 40 is not fractured since the elongation at break of the adhesion layer 40 is much larger than that of the first layer 10.

As described above, the water repellent film according to the present invention includes the first layer, the second layer and the third layer having the above-described characteristics. Therefore, the water repellent film has an excellent resistance to abrasion while ensuring a high water repellent property. Further, since the pitch between the fine protrusions is controlled to be 380 nm or less, reflection of visible light can be decreased to an extremely low level. Accordingly, when the water repellent film is applied to a component for a vehicle and other applications, such as a meter cover and a windshield, reflection of surrounding sceneries or interiors on the film can be prevented while ensuring a water repellent property.

When the water repellent film according to the present invention is used for window glass or an analog meter, all of the first layer, the second layer and the third layer included in the water repellent film are preferably transparent. On the other hand, when the water repellent film is used for a digital meter or a screen of a car navigation system, the first layer and the third layer may have opaque areas for the purpose of adding an anti-glare function and a depolarization function.

EXAMPLES

Hereinafter, the present invention will be further explained in detail with reference to examples. However, the scope of the present invention is not limited to those examples.

Examples 1 to 19

First, a film to be the third layer and an ultraviolet curable monomer for forming the first layer were prepared for respective Examples 1 to 3 and 8 to 19, as shown in Table 1. Note that, "flexible acrylic resin" in Table 1 is ACRYPLEN (registered trademark) manufactured by Mitsubishi Rayon Co., Ltd. Next, the ultraviolet curable monomer was applied to one surface of the film to be the third layer. Then, a metal mold for forming fine protrusions having dimensions described in Table 2 was pressed against the monomer, followed by irradiation of ultraviolet from the film to be the third layer, so that the monomer was cured. Subsequently, the film was separated from the metal mold, so as to prepare the film provided with the fine protrusions on the first layer for the respective examples. Thereafter, the second layer described in Table 1 was applied to the film of the respective examples by use of a sputtering method.

With regard to Example 4, a film to be the third layer and a urethane gel (product name: PANDEX (registered trademark) <two-component curable type>, manufactured by DIC Corporation) for forming the first layer were prepared, as shown in Table 1. Next, the gel solution was applied to a metal mold for forming fine protrusions having dimensions described in Table 2, and the metal mold was pressed against the film to be the third layer, followed by curing at 100° C. for one hour. Then, the film was separated from the metal mold, so as to prepare the film provided with the fine protrusions on the first layer. Thereafter, the second layer described in Table 1 was applied to the film by use of a sputtering method.

With regard to Example 5, a film to be the third layer and a silicone gel (product name: KE-1051, manufactured by Shin-Etsu Chemical Co. Ltd.) for forming, the first layer were prepared, as shown in Table 1. Next, the silicone gel solution was applied to a metal mold for forming fine protrusions having dimensions described in Table 2, and the metal mold was pressed against the film to be the third followed by curing at 100° C. for one hour. Then, the film was separated from the metal mold, so as to prepare the film provided with the fine protrusions on the first layer. Thereafter, the second layer described in Table 1 was applied to the film by use of a sputtering method.

With regard to Examples 6 and 7, a film to be the third layer was prepared. In addition, for the formation of the first layer, a mixture solution of 5% of polycaprolactone (product name: PCL-220, manufactured by Daicel Chemical Industries, Ltd.) and 95% of 4,4'-diphenylmethane diisocyanate (product name: Millionate MT, manufactured by Nippon Polyurethane Industry Co., Ltd.) was prepared. Next, the mixture solution was applied to a metal mold for forming fine protrusions having dimensions described in Table 2, and the metal mold was pressed against the film to be the third layer, followed by curing at 130° C. for one hour. Then, the film was separated from the metal mold, so as to prepare the film provided with the fine protrusions on the first layer for the respective examples. Thereafter, the second layer described in Table 1 was applied to the film for the respective examples by use of a sputtering method.

With regard to Examples 1 to 8 and 15 to 19, the surface of the second layer was subjected to surface treatment using perfluoroethertrimethoxysilane as a water repellent material. More specifically, a solution obtained by diluting perfluoroethertrimethoxysilane with hydrofluoroether (product name: HFE-7100, manufactured by Sumitomo 3M Limited) by 0.1% was prepared. Next, the film provided with the second layer for the respective examples was impregnated with this solution, and pulled up at a pull-up rate of 10 mm/sec. so as to apply the solution to the surface of the second layer. Thereafter, the film applied with the solution was dried at 100° C. for one hour, followed by fixing water repellent groups to the surface of the second layer provided on fine protrusions, thereby obtaining the water repellent film for the respective examples. Note that, perfluoroethertrimethoxysilane is indicated by a reference symbol "a" in Table 2.

With regard to Examples 9, 11 and 13, the second layer was subjected to the same surface treatment using (heptadecafluoro-1,1,2,2-tetrahydrodecyl)trimethoxysilane (manufactured by AZmax Co., Ltd.). Note that, (heptadecafluoro-1,1,2,2-tetrahydrodecyl)trimethoxysilane is indicated by a reference symbol "b" in Table 2.

With regard to Examples 10 and 14, the second layer was subjected to the same surface treatment using (heptafluorooctyl)trimethoxysilane (manufactured by AZmax Co., Ltd.). Note that, (heptafluorooctyl)trimethoxysilane is indicated by a reference symbol "c" in Table 2. With regard to Example 12, the second layer made of hafnia was not subjected to surface treatment.

Comparative Example 1

First, a fine protrusion pattern was transferred to PVA, so as to prepare a replica mold of fine protrusions having dimensions described in Table 2. Next, polysiloxane was poured into the replica mold. Then, the third layer subjected to corona treatment was pressed against the polysiloxane, and heated at 100° C. for 24 hours, followed by keeping at constant temperature and humidity at 100° C. and at 60% humidity for 24 hours, thereby forming a film composed of the first layer having the fine protrusions and the third layer. In this comparative example, the film was not provided with the second layer.

Comparative Example 2

A film composed of the first layer and the third layer was prepared in the same manner as Example 3. However, the film was not provided with the second layer in this example.

The materials, properties and thicknesses of the first layer to third layer for the respective examples and comparative examples are shown in Table 1. The respective values of each modulus of elasticity in Table 1 were measured according to the method described in JIS K 6911 of Japanese Industrial Standard. The elongation at break was measured according to the method described in JIS K 7161 (ISO 527). In addition, the thicknesses of the respective layers, and the pitches, heights and tip diameters of the fine protrusions were measured using a scanning electron microscope (SEM), respectively.

TABLE 1

| | Third Layer | | | | First Layer | | | Second Layer | | | |
|---|---|---|---|---|---|---|---|---|---|---|---|
| | Material | Modulus of Elasticity (GPa) | Thickness (μm) | Elongation at Break (%) | Material | Modulus of Elasticity (GPa) | Thickness (μm) | Material | Modulus of Elasticity (GPa) | Thickness (μm) | Contact Angle (°) |
| Example 1 | PET | 3.5 | 25 | 150 | Cross-linked PMMA | 3.8 | 8 | Silicon Oxide | 780 | 10 | 21 |
| Example 2 | PET | 3.5 | 20 | 150 | Cross-linked PMMA | 4 | 5 | Zirconium Oxide | 210 | 15 | 25 |
| Example 3 | PET | 3.5 | 100 | 150 | Cross-linked PMMA | 5 | 5 | Zirconium Oxide | 210 | 30 | 25 |
| Example 4 | Silicon | 0.05 | 100 | 300 | Urethane Gel | 0.1 | 30 | Silicon Oxide | 50 | 10 | 21 |
| Example 5 | Silicon | 0.1 | 100 | 250 | Silicon Gel | 0.3 | 30 | Silicon Oxide | 60 | 10 | 21 |
| Example 6 | Silicon | 0.3 | 200 | 200 | Urethane Elastomer | 0.7 | 30 | Silicon Oxide | 70 | 10 | 21 |
| Example 7 | Silicon | 0.3 | 200 | 200 | Urethane Elastomer | 0.7 | 30 | Silicon Oxide | 80 | 10 | 21 |
| Example 8 | Flexible Acrylic Resin | 2 | 50 | 50 | Cross-linked PMMA | 2.8 | 15 | Silicon Oxide | 70 | 10 | 21 |
| Example 9 | Flexible Acrylic Resin | 1.2 | 50 | 50 | Cross-linked PMMA | 4 | 10 | Aluminum Oxide | 70 | 5 | 21 |
| Example 10 | Flexible Acrylic Resin | 1.3 | 100 | 50 | Cross-linked PMMA | 4 | 10 | Aluminum Oxide | 65 | 5 | 21 |
| Example 11 | Flexible Acrylic Resin | 0.9 | 100 | 50 | Cross-linked PMMA | 4.5 | 10 | Aluminum Oxide | 70 | 10 | 21 |
| Example 12 | Flexible Acrylic Resin | 0.9 | 100 | 50 | Cross-linked PMMA | 4.5 | 10 | Hafnia | 70 | 5 | 90 |
| Example 13 | Acrylic Resin | 2.8 | 200 | 40 | Cross-linked PMMA | 5 | 8 | Zirconium Oxide | 210 | 15 | 25 |
| Example 14 | Acrylic Resin | 3 | 200 | 40 | Cross-linked PMMA | 5 | 1 | Zirconium Oxide | 210 | 30 | 25 |
| Example 15 | Flexible Acrylic Resin | 2 | 100 | 50 | Cross-linked PMMA | 3.8 | 6 | Silicon Oxide | 70 | 5 | 15 |
| Example 16 | Flexible Acrylic Resin | 2 | 100 | 50 | Cross-linked PMMA | 2.8 | 8 | Silicon Oxide | 70 | 5 | 15 |
| Example 17 | Flexible Acrylic Resin | 1.9 | 200 | 50 | Cross-linked PMMA | 2.8 | 10 | Silicon Oxide | 70 | 5 | 15 |
| Example 18 | Flexible Acrylic Resin | 1.9 | 250 | 50 | Cross-linked PMMA | 2.8 | 10 | Silicon Oxide | 70 | 5 | 15 |
| Example 19 | Flexible Acrylic Resin | 1.9 | 250 | 50 | Cross-linked PMMA | 2.8 | 10 | Silicon Oxide | 70 | 5 | 15 |
| Comparative Example 1 | PET | 3.5 | 25 | 150 | SiOx | 65 | 10 | — | — | — | — |
| Comparative Example 2 | PET | 3.5 | 50 | 150 | PMMA | 2 | 5 | — | — | — | — |

TABLE 2

| | Fine Protrusions | | | | Surface Treatment | |
|---|---|---|---|---|---|---|
| | Configuration | Pitch (nm) | Height (nm) | Tip Diameter (nm) | Material | Contact Angle (°) |
| Example 1 | Circular Truncated Cone | 100 | 200 | 5 | a | 115 |
| Example 2 | Circular Truncated Cone | 380 | 500 | 30 | a | 115 |
| Example 3 | Circular Truncated Cone | 5000 | 5000 | 200 | a | 115 |
| Example 4 | Circular Truncated Cone | 250 | 250 | 15 | a | 115 |
| Example 5 | Circular Truncated Cone | 250 | 500 | 10 | a | 115 |
| Example 6 | Circular Truncated Cone | 300 | 380 | 20 | a | 115 |
| Example 7 | Circular Truncated Cone | 300 | 300 | 10 | a | 115 |
| Example 8 | Circular Truncated Cone | 100 | 100 | 5 | a | 115 |
| Example 9 | Circular Truncated Cone | 100 | 200 | 7 | b | 110 |
| Example 10 | Circular Truncated Cone | 100 | 200 | 5 | c | 108 |
| Example 11 | Circular Truncated Cone | 200 | 200 | 5 | b | 110 |
| Example 12 | Circular Truncated Cone | 200 | 200 | 5 | — | — |
| Example 13 | Hemisphere | 2000 | 2000 | 0 | b | 110 |
| Example 14 | Truncated Square Pyramid | 5000 | 3000 | 100 | c | 108 |
| Example 15 | Bell Shape | 100 | 200 | — | a | 115 |
| Example 16 | Bell Shape | 100 | 200 | — | a | 115 |
| Example 17 | Bell Shape | 100 | 200 | — | a | 115 |
| Example 18 | Bell Shape | 100 | 200 | — | a | 115 |
| Example 19 | Frustum Shape | 100 | 200 | — | a | 115 |
| Comparative Example 1 | Circular Truncated Cone | 100 | 200 | 5 | — | — |
| Comparative Example 2 | Circular Truncated Cone | 300 | 600 | 15 | — | — |

The fine films of Examples 1 to 19 and Comparative Examples 1 to 2 manufactured as described above were used for the evaluations of an abrasion resistance, an antireflection property and a water repellent property according to the following evaluation methods.

[Test Method for Evaluation of Abrasion Resistance]

The respective films were reciprocated 200 times using a traverse abrasion testing machine under the following conditions, followed by visually confirming damages of the films. In Table 3, the case in which no damage was visually confirmed is indicated by "circle", the case in which some damages were visually confirmed but acceptable is indicated by "triangle", and the case in which apparent damages were confirmed and an white-colored appearance was observed is indicated by "cross".

Friction cloth: Canvas cloth (JIS L 3102)
Load: 9.8 kPa
Stroke length: 100 mm
Friction rate: 30 reciprocation/minute

[Test Method for Evaluation of Antireflection Property]

The examples having the pitches of the fine protrusions of 380 nm or less were used to measure the visible light reflectance at 0 degree using a goniophoto meter (manufactured by Otsuka Electronics Co., Ltd.). In table 3, the case in which an arithmetic average value of the visible light reflectance is 0.5% or less is indicated by "circle", the case in which the arithmetic average value is more than 0.5% to 1% or less is indicated by "triangle", and the case in which the arithmetic average value is more than 1% is indicated by "cross". In this test method, since reflection was caused from the rear surface of the water repellent film of the respective examples, the rear surface was blacked out so as to measure the reflectance.

[Test Method for Evaluation of Water Repellent Property]

After the test for the evaluation of the abrasion resistance, the water repellent property was evaluated on a scale of 1 to 5 based on the following criteria according to the method specified by JIS L 1092 using a spray tester (manufactured by Toyo Seiki Seisaku-sho, Ltd.).

1: Get entire surface wet

2: Get surface wet without maintaining spherical droplet shape on surface

3: Have spherical droplets adhering to surface

4: Have fine spherical droplets slightly adhering to surface

5: Have no spherical droplet

The respective evaluation results are shown in Table 3. According to the results, it was confirmed that the abrasion resistance of the fine protrusions was improved by increasing the modulus of elasticity of the second layer more than the first layer. In addition, it was also confirmed that the abrasion resistance was improved by decreasing the modulus of elasticity of the third layer less than the first layer. Further, according to the examples, it was confirmed that a particularly excellent water repellent property was exerted when the contact angle in the fine protrusions of the surface of the second layer or the contact angle after surface treatment of the second layer was high.

TABLE 3

| | Abrasion Resistance | Antireflection Property | Water Repellent Property | Note |
|---|---|---|---|---|
| Example 1 | ○ | ○ | 5 | Surface Treatment |
| Example 2 | ○ | ○ | 5 | Surface Treatment |
| Example 3 | ○ | — | 5 | Surface Treatment |
| Example 4 | ○ | ○ | 5 | Surface Treatment |
| Example 5 | ○ | ○ | 5 | Surface Treatment |
| Example 6 | ○ | ○ | 5 | Surface Treatment |
| Example 7 | ○ | ○ | 5 | Surface Treatment |
| Example 8 | ○ | ○ | 5 | Surface Treatment |
| Example 9 | ○ | ○ | 5 | Surface Treatment |
| Example 10 | ○ | ○ | 5 | Surface Treatment |
| Example 11 | ○ | ○ | 5 | Surface Treatment |
| Example 12 | ○ | ○ | 5 | No Surface Treatment |
| Example 13 | ○ | — | 5 | Surface Treatment |
| Example 14 | ○ | — | 5 | Surface Treatment |
| Example 15 | ○ | ○ | 5 | Surface Treatment |
| Example 16 | ○ | ○ | 5 | Surface Treatment |
| Example 17 | ○ | ○ | 5 | Surface Treatment |
| Example 18 | ○ | ○ | 5 | Surface Treatment |
| Example 19 | ○ | ○ | 5 | Surface Treatment |

TABLE 3-continued

| | Abrasion Resistance | Anti-reflection Property | Water Repellent Property | Note |
|---|---|---|---|---|
| Comparative Example 1 | X | — | — | — |
| Comparative Example 2 | X | — | 1 | — |

Although the present invention has been described above by reference to the embodiment and the examples, the present invention is not limited to those, and it will be apparent to these skilled in the art that various modifications and improvements can be made.

INDUSTRIAL APPLICABILITY

In the water repellent film according to the present invention, the relationships among the modulus of elasticity of the first layer, the modulus of elasticity E2 of the second layer, and the modulus of elasticity E3 of the third layer are defined as E2>E1>E3. Therefore, a water repellent film having excellent resistance to abrasion, in which a fine structure is not easily abraded and damaged by an external friction force such as a rain impact and a removal of dirt with a cloth on the surface of the film, and a component for a vehicle including the film can be provided.

REFERENCE SIGNS LIST

A Pitch
10 First layer
20 Second layer
30 Third layer
100 Fine protrusions
200 Water repellent film

The invention claimed is:

1. A water repellent film, comprising:
   a first layer having a plurality of fine protrusions on a surface thereof;
   a second layer covering the fine protrusions and having a water repellent property; and
   a third layer provided on a surface of the first layer on an opposite side of the fine protrusions,
   wherein when a modulus of elasticity of the first layer is defined as E1, a modulus of elasticity of the second layer is defined as E2, and a modulus of elasticity of the third layer is defined as E3, a definition of E2>E1>E3 is fulfilled,
   wherein the thickness of the first layer is between 1 µm and 30 µm,
   wherein the third layer includes a cellulose film.

2. The water repellent film according to claim 1, wherein a pitch of the fine protrusions is 380 nm or less.

3. The water repellent film according to claim 1, wherein a height of the fine protrusions is 100 nm or more.

4. The water repellent film according to claim 1, wherein a pitch of the fine protrusions is 150 nm or less.

5. The water repellent film according to claim 1, wherein a height of the fine protrusions is 600 nm or less.

6. The water repellent film according to claim 1, wherein a thickness of the third layer is larger than a thickness of the first layer.

7. The water repellent film according to claim 1, wherein a thickness T3 of the third layer is 20 µm≤T3≤250 µm.

8. The water repellent film according to claim 1, wherein an elongation at break $\epsilon_{max}$ of the third layer is 50% or more.

9. The water repellent film according to claim 1, wherein the modulus of elasticity of the first layer is between 0.1 GPa and 5 GPa, and the modulus of elasticity of the second layer is between 50 GPa and 210 GPa.

10. The water repellent film according to claim 1, wherein the fine protrusions are formed into a cone or pyramid shape, or a frustum shape.

11. The water repellent film according to claim 1, wherein a thickness of the second layer is between 1 nm and 30 nm.

12. A component for a vehicle comprising the water repellent film according to claim 1.

13. The water repellent film according to claim 1, wherein the first layer includes a material selected from the group consisting of a thermoplastic resin, a styrene elastomer, a urethane elastomer, a silicone elastomer, and gel material, and
   wherein the thermoplastic resin includes a material selected from the group consisting of a non-cross-linked acrylic resin, a cross-linked acrylic resin, a cross-linked acrylic-urethane copolymer, a cross-linked acrylic-elastomer copolymer, a silicone elastomer, cross-linked polyvinyl alcohol, polyvinylidene chloride, polyethylene terephthalate, polyvinyl chloride, polycarbonate, modified polyphenylene ether, polyphenylene sulfide, polyether ether ketone, a liquid crystal polymer, fluororesin, polyarylate, polysulfone, polyether sulfone, thermoplastic polyimide, polyamide imide and polyether imide.

14. The water repellent film according to claim 1, wherein the second layer includes a material selected from the group consisting of a transparent inorganic and a ceramic material,
   wherein the transparent inorganic includes a material selected from the group consisting of glass, silicon oxide, and aluminum oxide, and
   wherein the ceramic material includes a material selected from the group consisting of silicon nitride, magnesium oxide, titanium oxide, indium oxide, niobium oxide, zirconium oxide, zinc oxide, ITO, barium titanate, and hafnia.

15. A water repellent film, comprising:
   a first layer having a plurality of fine protrusions on a surface thereof;
   a second layer covering the fine protrusions and having a water repellent property; and
   a third layer provided on a surface of the first layer on an opposite side of the fine protrusions,
   wherein when a modulus of elasticity of the first layer is defined as E1, a modulus of elasticity of the second layer is defined as E2, and a modulus of elasticity of the third layer is defined as E3, a definition of E2>E1>E3 is fulfilled, and
   wherein the thickness of the first layer is between 1 µm and 30 µm,
   wherein the first layer includes gel material.

* * * * *